United States Patent
Maas et al.

(10) Patent No.: US 9,284,908 B2
(45) Date of Patent: Mar. 15, 2016

(54) METHOD FOR PERFORMING A NUMBER OF INJECTIONS

(75) Inventors: Joerg Maas, Remseck (DE); Stefan Schempp, Wernau (DE)

(73) Assignee: ROBERT BOSCH GMBH, Stuttgart (DE)

(*) Notice: Subject to any disclaimer, the term of this patent is extended or adjusted under 35 U.S.C. 154(b) by 986 days.

(21) Appl. No.: 13/138,165

(22) PCT Filed: Dec. 17, 2009

(86) PCT No.: PCT/EP2009/067381
§ 371 (c)(1),
(2), (4) Date: Sep. 27, 2011

(87) PCT Pub. No.: WO2010/081607
PCT Pub. Date: Jul. 22, 2010

(65) Prior Publication Data
US 2012/0016572 A1   Jan. 19, 2012

(30) Foreign Application Priority Data
Jan. 16, 2009  (DE) .................. 10 2009 000 265

(51) Int. Cl.
*F02D 41/34*   (2006.01)
*F02D 41/22*   (2006.01)

(52) U.S. Cl.
CPC ............ *F02D 41/345* (2013.01); *F02D 41/221* (2013.01); *Y02T 10/44* (2013.01)

(58) Field of Classification Search
CPC ...... F02D 41/345; F02D 41/221; Y02T 10/44
USPC ........................................................ 701/105
See application file for complete search history.

(56) References Cited

U.S. PATENT DOCUMENTS

| | | | | |
|---|---|---|---|---|
| 4,367,716 A * | 1/1983 | Yasuhara | ............... | F02D 41/266 123/478 |
| 4,541,390 A * | 9/1985 | Steinbrenner | ......... | F02D 41/064 123/478 |
| 4,867,115 A * | 9/1989 | Henein | ................. | F02D 35/023 123/179.17 |
| 5,277,165 A * | 1/1994 | Matsuo | ............... | F02D 41/0002 123/308 |
| 5,634,448 A * | 6/1997 | Shinogle | ............. | F02D 41/2435 123/478 |
| 6,032,642 A * | 3/2000 | Trumbower | .......... | F02D 41/068 123/299 |
| 6,125,823 A * | 10/2000 | Thomas | .............. | F02D 41/1497 123/299 |
| 6,363,314 B1 * | 3/2002 | Hafner | .................... | F02D 41/20 123/446 |
| 6,390,082 B1 * | 5/2002 | Duffy | ...................... | F02D 41/10 113/490 |
| 6,415,762 B1 * | 7/2002 | Hafner | ................ | F02D 41/3827 123/300 |

(Continued)

FOREIGN PATENT DOCUMENTS

DE   101 31 925   2/2002
GB   2 061 379    5/1981

(Continued)

OTHER PUBLICATIONS

Toyota Motor Sales, Fuel systems #2, Nov. 28, 2004.*

*Primary Examiner* — Hieu T Vo
*Assistant Examiner* — Sherman Manley
(74) *Attorney, Agent, or Firm* — Kenyon & Kenyon LLP

(57) ABSTRACT

In a method for carrying out a number of injections for at least one cylinder of an internal combustion engine, a reference point in time for a control application onset of an injection is ascertained for the at least one cylinder, and a target point in time for the control application onset is determined from the reference point in time plus a delay time.

4 Claims, 1 Drawing Sheet

(56) References Cited

U.S. PATENT DOCUMENTS

| | | | | |
|---|---|---|---|---|
| 6,729,297 B2 * | 5/2004 | Futonagane | F02D 41/3836 | |
| | | | 123/294 | |
| 6,850,835 B1 * | 2/2005 | Barnes | F02D 41/0087 | |
| | | | 123/299 | |
| 6,879,903 B2 * | 4/2005 | Jaliwala | F02D 41/2441 | |
| | | | 123/478 | |
| 7,025,047 B2 * | 4/2006 | Leman | F02D 41/2467 | |
| | | | 123/478 | |
| 8,539,935 B2 * | 9/2013 | Nakata et al. | 123/480 | |
| 2004/0128055 A1 * | 7/2004 | Jaliwala | F02D 41/2441 | |
| | | | 701/104 | |
| 2006/0149456 A1 * | 7/2006 | Radue | F02D 41/2432 | |
| | | | 701/105 | |
| 2007/0265764 A1 * | 11/2007 | Nakata | F02D 41/0097 | |
| | | | 701/105 | |
| 2009/0056678 A1 * | 3/2009 | Nakata | F02D 41/221 | |
| | | | 123/480 | |
| 2011/0030665 A1 * | 2/2011 | Protin | F02D 41/0042 | |
| | | | 123/704 | |

FOREIGN PATENT DOCUMENTS

| | | |
|---|---|---|
| JP | 56-52533 | 5/1981 |
| JP | 2000-54906 | 2/2000 |
| JP | 2002-188502 | 7/2002 |
| JP | 2002-525482 | 8/2002 |
| JP | 2004-308464 | 11/2004 |
| JP | 2005-120872 | 5/2005 |
| WO | WO 00/19090 | 4/2000 |

\* cited by examiner

METHOD FOR PERFORMING A NUMBER OF INJECTIONS

BACKGROUND OF THE INVENTION

1. Field of the Invention

The present invention relates to: a method for carrying out a number of injections; a method for testing a function of an injection system of an internal combustion engine; an apparatus which is embodied to carry out, for at least one cylinder of an internal combustion engine, a number of injections; an assemblage for testing a function of an injection system of an internal combustion engine; a computer program; and a computer program product.

2. Description of Related Art

As a result of legislation regarding a diagnostic system integrated into a vehicle (so-called on-board diagnosis [OBD]), monitoring functions whose purpose is to monitor adherence to operating parameters over the life span of the vehicle are implemented in the control unit. Among the checks made are one as to whether the operating parameters are possibly exceeding permissible tolerance values.

The effectiveness of these monitoring actions must be verified, for example, before an authority, such as the California Air Resources Board (CARE). Provision is made for some of the monitoring functions that are provided for to react to delayed opening of an injection system or of an injector, as compared with the reference opening time provided for in regular fashion.

In order to carry out this test for checking these monitoring functions, there are two possibilities for bringing about this delayed opening. It is possible, for example, to install in a vehicle being tested a previously used injector that exhibits exactly the desired behavior. This variant is difficult to implement, however, since a corresponding injector is difficult to procure or manufacture. Alternatively, it is conceivable to use a corresponding component to delay the control application signal in the injector lead. This component must, however, be removed again after the test is carried out.

BRIEF SUMMARY OF THE INVENTION

The invention relates to a method for carrying out a number of injections for at least one cylinder of an internal combustion engine. For the at least one cylinder, a reference point in time for a control application onset of an injection is ascertained, and a target point in time for the control application onset is determined from the reference point in time plus a delay time.

With the method, the injection is carried out typically at the point in time that is delayed, with respect to the reference point in time, by an amount equal to the delay time. The method makes it possible to monitor, and control accordingly in open- and/or closed-loop fashion, the operation of the internal combustion engine in terms of the performance of injections.

In an embodiment, the method can be used to activate a function for monitoring an operation of the internal combustion engine, so that a test of the function of the internal combustion engine can be carried out with the method. This relates, for example, to a function that reacts or responds to a delayed control application onset. In order to carry out a test of the function, the delay is deliberately brought about in order to verify that the function reacts correctly. In a standard operating mode of the internal combustion engine, the function is activated when a delay of the control application onset exists as a result of operation. The delay can occur, for example, when a fault exists in the execution sequence of an injection, or because of wear affecting the internal combustion engine or at least a component of the internal combustion engine.

The shift in the control application onset that is provided, for example, in the context of monitoring can be carried out as necessary with input of an instruction, provided therefor, into a control unit that interacts with the internal combustion engine. The method can furthermore be executed in software-assisted fashion.

In an embodiment, only the control application onset is modified with the method that is being presented. A usual, unmodified target control application duration is used for a control application duration and thus for a time duration of the control application. In an embodiment, a duration of the delay time is thus set as an operating parameter. It is also possible, however, to modify other operating parameters, and thus also a target control application duration, as necessary in the context of the method, so as thereby to bring about modified injection execution sequences. In an embodiment of the method, faulty injections that result, inter alia, from a shift in the control application onset are typically triggered for test purposes.

Independently of any delay in control application onset that is provided, the reference point in time for the control application onset is calculated, for the injection that is to be carried out, as a function of an angle relative to a top dead center point of the piston that is associated with a cylinder.

The invention also relates to a method for testing a function of an injection system of an internal combustion engine, in which method at least one injection is carried out by way of a method described above. The injection system encompasses, for example, a number of injection valves as well as a control unit interacting with said injection valves.

The apparatus that is presented is embodied to carry out and thus (among other things) monitor, for at least one cylinder of an internal combustion engine, a number of injections. For this purpose, the apparatus is embodied to ascertain, for the at least one cylinder, a reference point in time for a control application onset of an injection, and to determine, from the reference point in time plus a delay time, a target point in time for the control application onset.

The assemblage, further provided according to the present invention, for testing a function of an injection system of an internal combustion engine has at least one above-described apparatus according to the present invention that is embodied to carry out, for at least one cylinder of an internal combustion engine, a number of injections.

The software-assisted delay provision that can be carried out in the context of the invention is available at any time, and generates no additional costs. In addition, the delay time can be set exactly and in accordance with demand as required. An offset shift of the invention system to verify a function of an onboard diagnosis (OBD) system can usually be achieved with the method by setting the delay time.

In an embodiment, it is possible with the invention to apply control, via a tester and/or via an application as components of an embodying form of the assemblage according to the present invention, to an interface in the software of the control unit via a field bus, for example a CAN bus. The control application onset for a selected injection valve for a selected injector can thus be shifted in time while maintaining the control application duration, thus retaining neutrality in terms of a volume of fuel to be injected with no change in the injection duration. In an implementation of the invention, all the injections for the selected cylinder can also be shifted.

The apparatus described is embodied to carry out all the steps of the method presented. Individual steps of this method can also be carried out by individual components of the apparatus. In addition, functions of the apparatus or functions of individual components of the apparatus can be implemented as steps of the method. It is furthermore possible for steps of the method to be implemented as functions of individual components of the apparatus or of the entire apparatus.

The invention further relates to a computer program having a program code means for carrying out all steps of an above-described method when the computer program is executed on a computer or a corresponding computation unit, in particular in an apparatus according to the present invention.

The computer program product according to the present invention, having program code means that are stored on a computer-readable data medium, is embodied to carry out all steps of an above-described method when the computer program is executed on a computer or a corresponding computation unit, in particular in an apparatus according to the present invention.

In the creation of an injection execution sequence, a control application onset that is made up of an angle relative to the top dead center point and/or to the main injection, and of a delay or offset time referred thereto, is calculated for at least one injection type, for example for pre-injections, main injections, and/or post-injections, regardless of a cylinder to be influenced in terms of its function in the context of the method.

The reference point in time that is usually provided is programmed in a so-called static interrupt for each cylinder and injection type. A cylinder to be investigated in the context of the method can be selected by way of a tester interface. In a static interrupt, an internal cylinder counter and a cylinder selection value can assume the same value. In addition, the actual reference point in time in the angle/time pair of each control application is acted upon, before transfer of a target point in time to a coprocessor, by a cylinder selection value that can likewise be defined via a tester interface. Programming of the control application onset then occurs. In an application of the method, a stipulated function can be selected via the tester interface and parameterized as well as switched to be active.

It is understood that the features recited above and those yet to be explained below can be used not only in the respective combination indicated, but also in other combinations or in isolation, without leaving the context of the present invention.

DETAILED DESCRIPTION OF THE INVENTION

Figure 1:
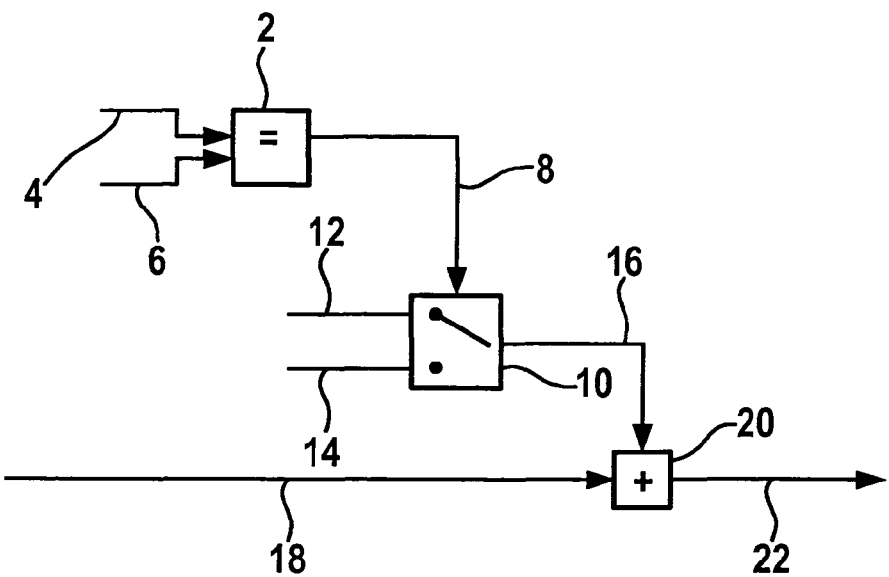
FIG. 1 schematically depicts a circuit diagram for carrying out an embodiment of the method according to the present invention.

The invention is schematically depicted in the drawings on the basis of embodiments, and will be described in detail below with reference to the drawings.

In the circuit diagram of FIG. 1 provided in order to describe an embodiment of the method, first a comparison 2 is made between a selection value 4 InjVlv_ctCylOffsetRemote_C for a cylinder and a count value 6 Epm_ctCy of an internal cylinder counter. An intermediate value 8 is delivered, as a result of this comparison 2, to a selection module 10. Also delivered to this selection module is either the value zero 12 or a cylinder selection value 14 InjVlv_tiOffsetRemote_C. As a result of a selection carried out by selection module 10, a delay time 16 is made available and is delivered to a reference point in time 18 InjVlv_tiDes xxx for application of control to a cylinder; from this, a target point in time 22 for a control application onset is calculated by addition 20.

The reference point in time 18 is programmed in so-called static interrupts or a static interrupt for each cylinder and each injection type, and then converted correspondingly, by a coprocessor in the microcontroller, into a control application.

A specific cylinder can consequently be selected via a tester interface by way of the cylinder selection value 14 InjVlv_ctCylOffsetRemote_C. In the static interrupts, in which an internal cylinder counter assumes the same counter value 6 Epm_ctCyl as in the case of the cylinder selection value 14 InjVlv_ctCylOffsetRemote_C, the actual reference point in time 18 InjVlv_tiDes xxx is determined, "xxx" standing in as a placeholder for various injection types. An angle/time pair for each control application is acted upon, before the value is transferred to the coprocessor, by the cylinder selection value 14 InjVlv_tiOffsetRemote_C, which can likewise be defined via the tester interface. Programming of the control application onset then occurs: the delay time 16 is added to the reference point in time 18, thus calculating the target point in time 22. In an application of the method, a stipulated function can be selected via an interface of a control unit and parameterized as well as switched to be active.

Figure 2:
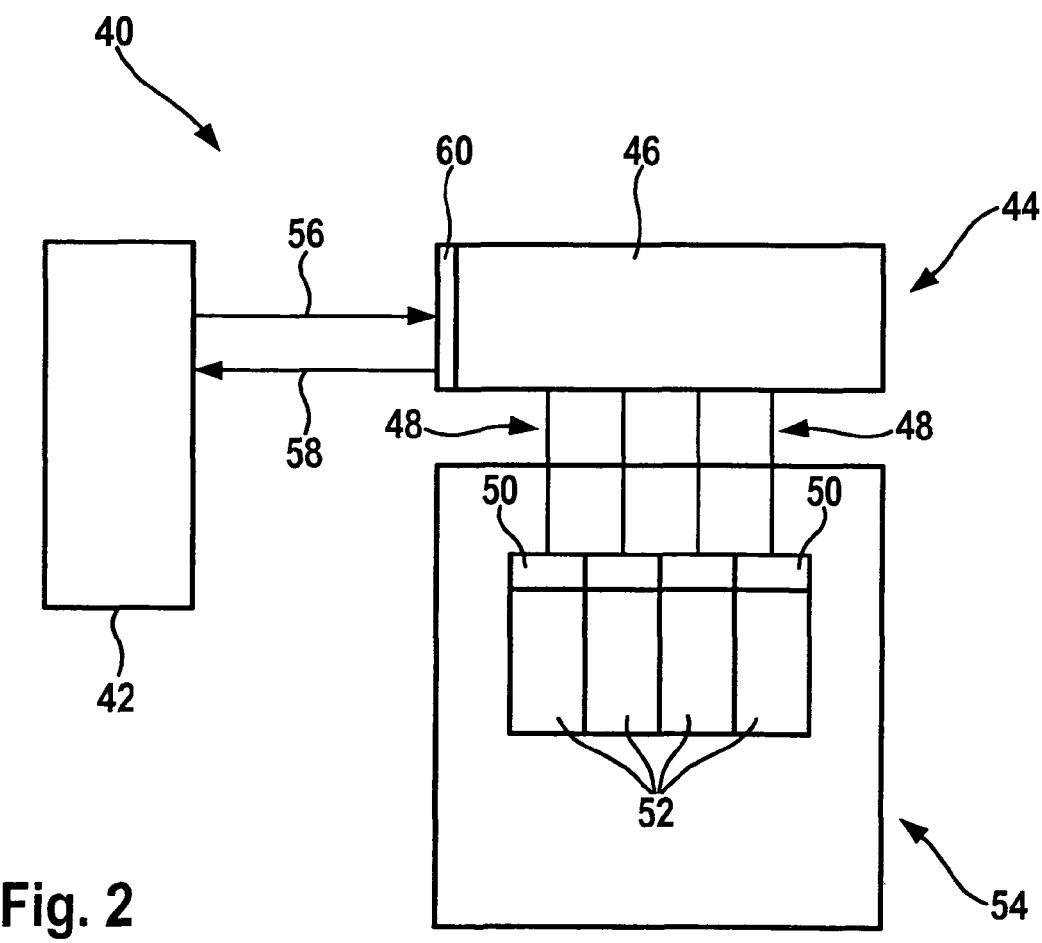
FIG. 2 schematically depicts an embodiment of an assemblage according to the present invention that encompasses an embodiment of an apparatus according to the present invention.

The embodiment schematically depicted in FIG. 2 of an assemblage 40 according to the present invention encompasses a test device 42 as well as an embodiment of an apparatus 44 according to the present invention which is embodied to carry out, for at least one cylinder 52 of an internal combustion engine 54, a number of injections. This apparatus 44 encompasses a control unit 46 as well as, in the present embodiment, four input leads 48 through which control unit 46 is connected to, once again, four injection valves 50. Each injection valve 50 is associated with a cylinder 52 of internal combustion engine 54. In a conventional operating mode of internal combustion engine 54, control unit 46 controls functional execution sequences of injection valves 50, corresponding instructions being transmitted to injection valves 50 via input leads 48.

A variety of functions, implementation of which enables the operation of internal combustion engine 54 to proceed smoothly, are implemented by control unit 46 of apparatus 44.

In the present embodiment of the apparatus according to the present invention, provision is made that said apparatus carries out, for at least one cylinder of an internal combustion engine, a number of injections. As in the case of the conventional operating mode as well, a reference point in time for a control application onset of an injection is ascertained for at least one cylinder 52. Upon implementation of the method according to the present invention, provision is further made that a target point in time for the control application onset is determined, by apparatus 44, from a reference point in time plus a delay time. For this, the target point in time, which is dependent on the reference point in time and the delay time, is calculated in control unit 46 as a component of the apparatus according to the present invention. Upon implementation of the method, the target point is time is transmitted via a respective input lead 48 to an injection valve 50 that is associated with that cylinder 52 for which a delayed control application onset is to be carried out, so that a delayed injection occurs for the selected cylinder 52.

The method according to the present invention can be carried out, for example, in the context of a test of control unit 46 and/or of internal combustion engine 54. For this, an interface 60 of control unit 46 is connected to test unit 42 via an input lead 56 and a return lead 58. An instruction for implementation of the method is transmitted from test unit 42 to control unit 46, said instruction being received by control unit 46 via interface 60.

Provision is made that upon a delay in an injection of a cylinder 52, a function implemented in control unit 46 for monitoring an operation of internal combustion engine 54 is activated, said function verifying that the delay has occurred. If the delay is verified by the function, that verification can be transferred as a result via return lead 58 to test unit 42. In an implementation of the method according to the present invention, a check is therefore made as to whether the function, implemented in control unit 46, for monitoring operation of the internal combustion engine 54 is being carried out correctly.

What is claimed is:

1. An automated method for carrying out a plurality of injections for at least one cylinder of an internal combustion engine, comprising:
    ascertaining by a control apparatus, for the at least one cylinder, a reference point in time for a control application onset of an injection;
    ascertaining by the control apparatus, for the at least one cylinder, a target point in time for a delayed control application onset of the injection based on the reference point in time plus a delay time;
    wherein a monitoring function is provided in the control apparatus for monitoring an operation of the internal combustion, wherein the monitoring function is configured to verify the delayed control application onset of the injection and output a verification signal indicating the verification to a test unit connected to the control apparatus; and
    performing, by the test unit connected to the control apparatus, a test of the monitoring function by (i) deliberately applying the delay time to implement the delayed control application onset of the injection at the target point in time, and (ii) ascertaining by the test unit whether the monitoring function has verified that the delayed control application onset of the injection has occurred.

2. The method as recited in claim 1, wherein, for an injection to be carried out, the reference point in time is calculated as a function of a crank angle relative to a top dead center point.

3. A system configured to test a function of an injection system of an internal combustion engine, comprising:
    a control unit configured to control, for at least one cylinder of an internal combustion engine, a plurality of injections, wherein the control unit is configured to ascertain for the at least one cylinder (i) a reference point in time for a control application onset of an injection, and (ii) a target point in time for a delayed control application onset of the injection, based on the reference point in time plus a delay time, wherein a monitoring function is provided in the control unit for monitoring an operation of the internal combustion, wherein the monitoring function is configured to verify the delayed control application onset of the injection and output a verification signal indicating the verification to a test device connected to the control unit; and
    the test device connected to the control unit and configured to test the monitoring function of the control unit by (i) deliberately applying the delay time to implement the delayed control application onset of the injection at the target point in time, and (ii) ascertaining by the test device whether the monitoring function has verified that the delayed control application onset of the injection has occurred.

4. A non-transitory computer-readable data storage medium storing a computer program including program codes which, when executed on a computer, controls an automated method for carrying out a plurality of injections for at least one cylinder of an internal combustion engine, the method comprising:
    ascertaining by a control apparatus, for the at least one cylinder, a reference point in time for a control application onset of an injection;
    ascertaining by the control apparatus, for the at least one cylinder, a target point in time for a delayed control application onset of the injection based on the reference point in time plus a delay time; and
    testing, by a test device connected to the control apparatus, a monitoring function provided in the control apparatus for monitoring an operation of the internal combustion, wherein the monitoring function is configured to verify the delayed control application onset of the injection and output a verification signal indicating the verification to the test device connected to the control apparatus, and wherein a test of the monitoring function includes (i) deliberately applying the delay time to implement the delayed control application onset of the injection at the target point in time, and (ii) ascertaining by the test device whether the monitoring function has verified that the delayed control application onset of the injection has occurred.

* * * * *